United States Patent
Smathers et al.

(10) Patent No.: US 10,937,284 B2
(45) Date of Patent: Mar. 2, 2021

(54) SOMATOSENSORY FEEDBACK SYSTEM

(71) Applicant: HEWLETT-PACKARD DEVELOPMENT COMPANY, L.P., Houston, TX (US)

(72) Inventors: Kevin Smathers, Palo Alto, CA (US); Mithra Vankipuram, Palo Alto, CA (US); Hiroshi Horii, Palo Alto, CA (US); Alexander Thayer, Palo Alto, CA (US); Sarthak Ghosh, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 19 days.

(21) Appl. No.: 16/077,322

(22) PCT Filed: Jan. 23, 2017

(86) PCT No.: PCT/US2017/014594
§ 371 (c)(1),
(2) Date: Aug. 10, 2018

(87) PCT Pub. No.: WO2018/136102
PCT Pub. Date: Jul. 26, 2018

(65) Prior Publication Data
US 2019/0057582 A1 Feb. 21, 2019

(51) Int. Cl.
*G08B 6/00* (2006.01)
*A63F 13/85* (2014.01)
*A63F 13/28* (2014.01)

(52) U.S. Cl.
CPC ............... *G08B 6/00* (2013.01); *A63F 13/28* (2014.09); *A63F 13/85* (2014.09); *A63F 2300/8082* (2013.01)

(58) Field of Classification Search
None
See application file for complete search history.

(56) References Cited

U.S. PATENT DOCUMENTS

| | | | | |
|---|---|---|---|---|
| 5,559,761 A * | 9/1996 | Frenkel | ................. | G04G 21/06 368/187 |
| 5,686,882 A * | 11/1997 | Giani | ................... | G04G 13/028 340/407.1 |
| 5,836,671 A * | 11/1998 | Chien | .................... | A45C 15/06 362/84 |
| 7,050,360 B2 * | 5/2006 | Saito | ....................... | G04G 13/02 368/230 |
| 7,173,881 B1 * | 2/2007 | Freudenberg, Jr. | ..... | G04F 10/00 340/540 |
| 7,404,506 B1 * | 7/2008 | Ross | ...................... | A45C 13/28 177/164 |

(Continued)

OTHER PUBLICATIONS

Stern, "Buzzing Mindfulness Bracelet Feel the Passage of Time", Retrieved from Internet: https://learn.adafruit.com/buzzing-mindfulness-bracelet/overview, Jun. 10, 2015, 11 pages.

*Primary Examiner* — Curtis J King
(74) *Attorney, Agent, or Firm* — Fabian VanCott

(57) ABSTRACT

A somatosensory feedback system may include at least one somatosensory feedback device to, when actuated, invoke a sensation in a user. The somatosensory feedback system may instruct the at least one somatosensory feedback device to actuate to indicate a passage of time.

18 Claims, 10 Drawing Sheets

(56) References Cited

U.S. PATENT DOCUMENTS

| | | | |
|---|---|---|---|
| 7,503,131 B2 | 3/2009 | Nadel et al. | |
| 8,693,294 B1 * | 4/2014 | Tucker | G04C 21/16 |
| | | | 368/250 |
| RE45,525 E * | 5/2015 | Xiao | A63F 13/20 |
| | | | 434/4 |
| 9,092,954 B2 | 7/2015 | Visitacion et al. | |
| 9,552,707 B1 * | 1/2017 | Bala | G08B 6/00 |
| 2002/0012291 A1 * | 1/2002 | Robinett | G04G 13/02 |
| | | | 368/73 |
| 2006/0113343 A1 * | 6/2006 | Chang | A45F 3/12 |
| | | | 224/576 |
| 2009/0126728 A1 * | 5/2009 | Xiao | B64G 7/00 |
| | | | 128/202.14 |
| 2009/0131165 A1 | 5/2009 | Buchner et al. | |
| 2010/0240454 A1 * | 9/2010 | Xiao | B64D 23/00 |
| | | | 463/30 |
| 2012/0050031 A1 | 3/2012 | Ten et al. | |
| 2013/0123570 A1 | 5/2013 | Ly et al. | |
| 2014/0267076 A1 | 9/2014 | Birnbaum et al. | |
| 2015/0062018 A1 | 3/2015 | Naidu et al. | |
| 2015/0145656 A1 | 5/2015 | Levesque et al. | |
| 2015/0324646 A1 * | 11/2015 | Kimia | G06T 7/80 |
| | | | 348/62 |
| 2016/0154241 A1 * | 6/2016 | Alhashim | A63F 13/24 |
| | | | 345/8 |
| 2016/0187977 A1 | 6/2016 | Cruz-Hernandez et al. | |
| 2016/0267755 A1 * | 9/2016 | Martinson | G08B 6/00 |
| 2017/0146358 A1 * | 5/2017 | Ward | G06F 3/016 |
| 2018/0092444 A1 * | 4/2018 | Ward | A45B 25/00 |
| 2018/0374264 A1 * | 12/2018 | Gatson | G01S 1/74 |

\* cited by examiner

Somatosensory Feedback System (SFS)
100

Somatosensory Feedback Device (SFD)
120

*Fig. 1*

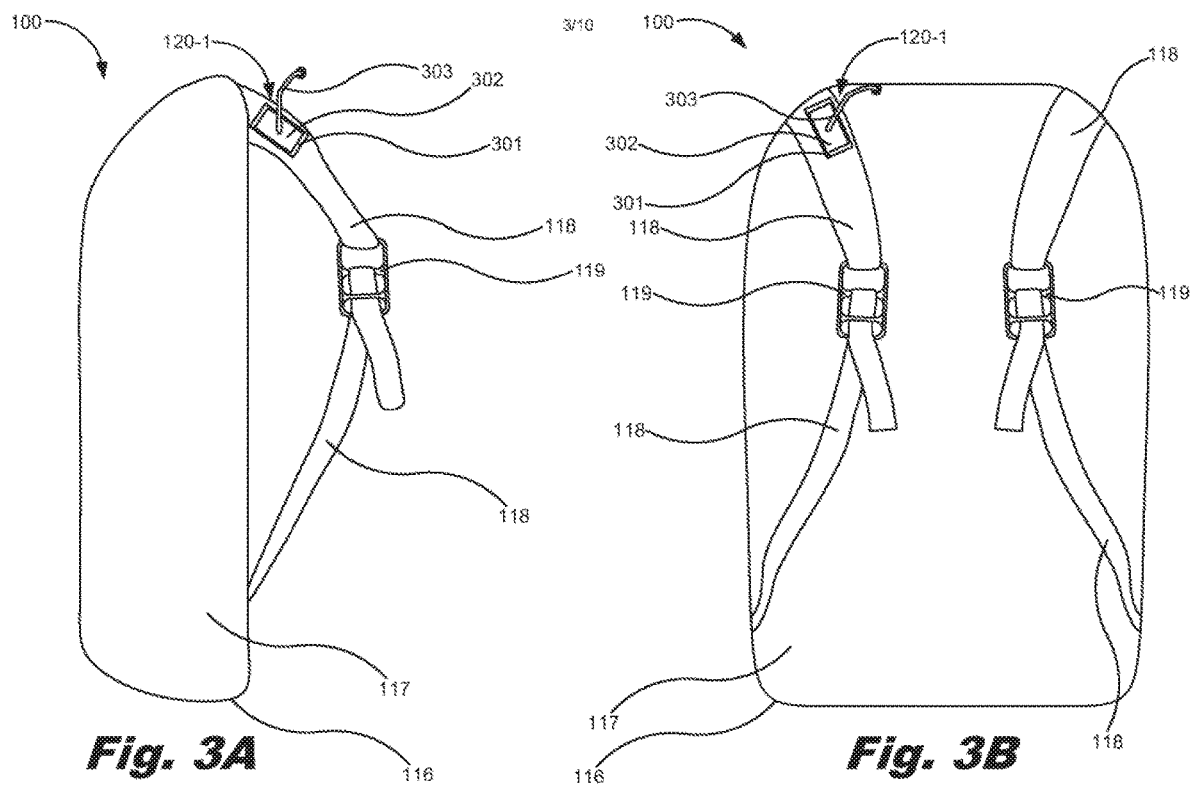

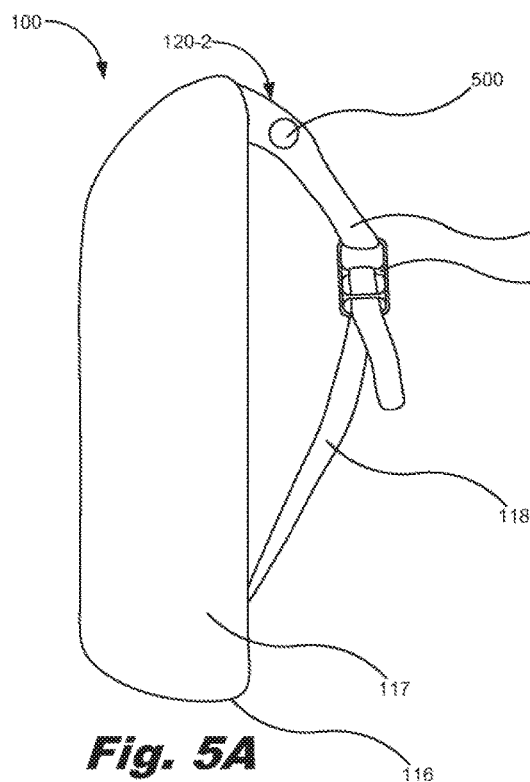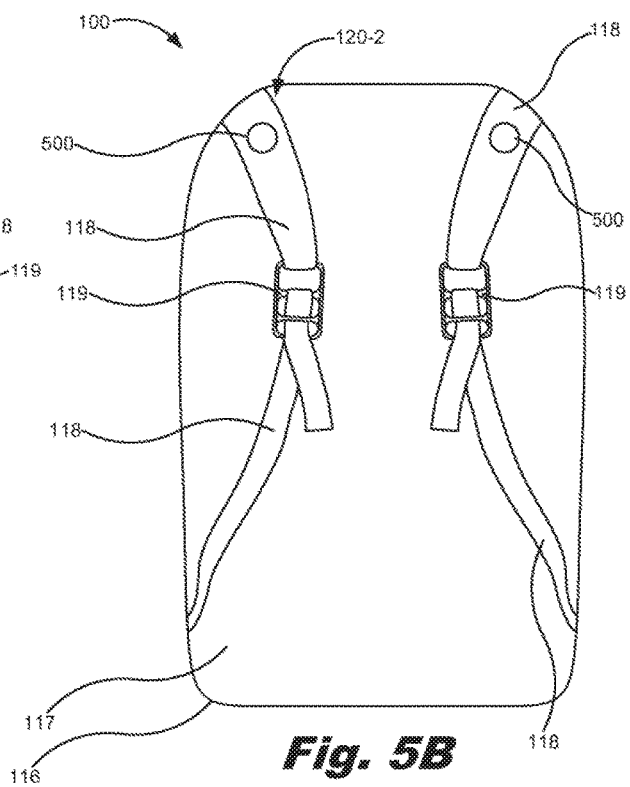
Fig. 5A
Fig. 5B

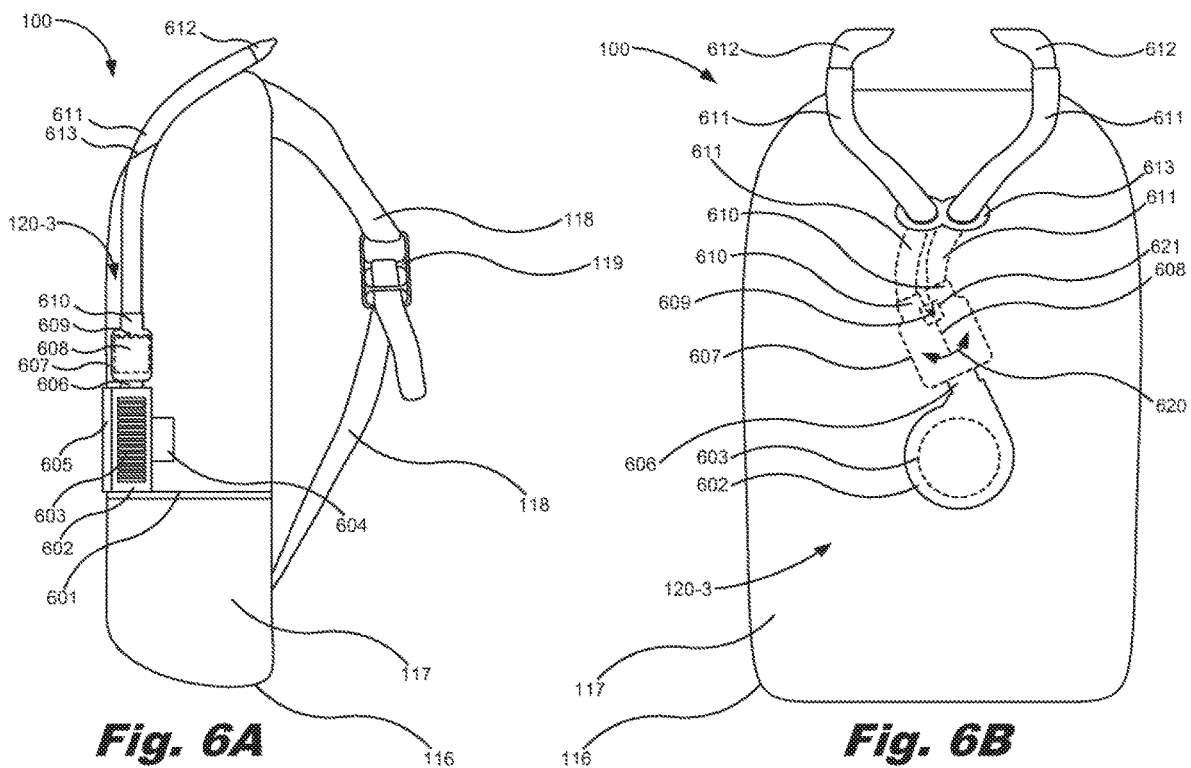

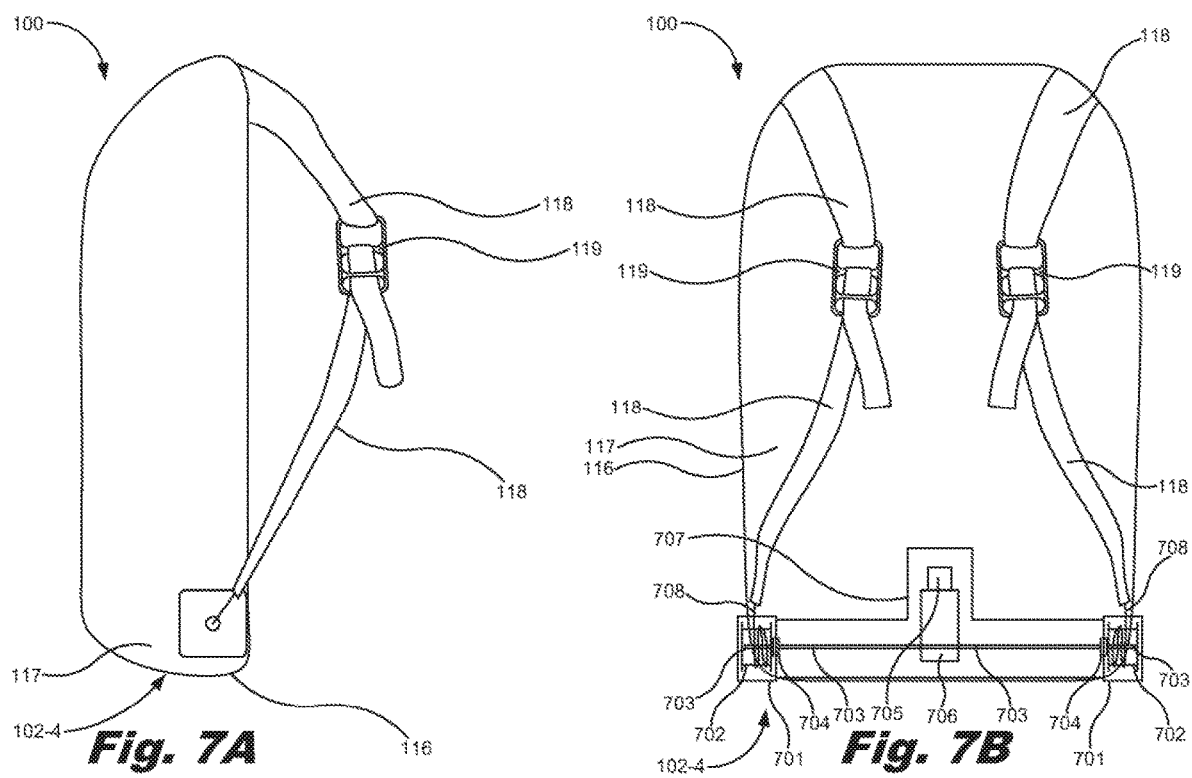

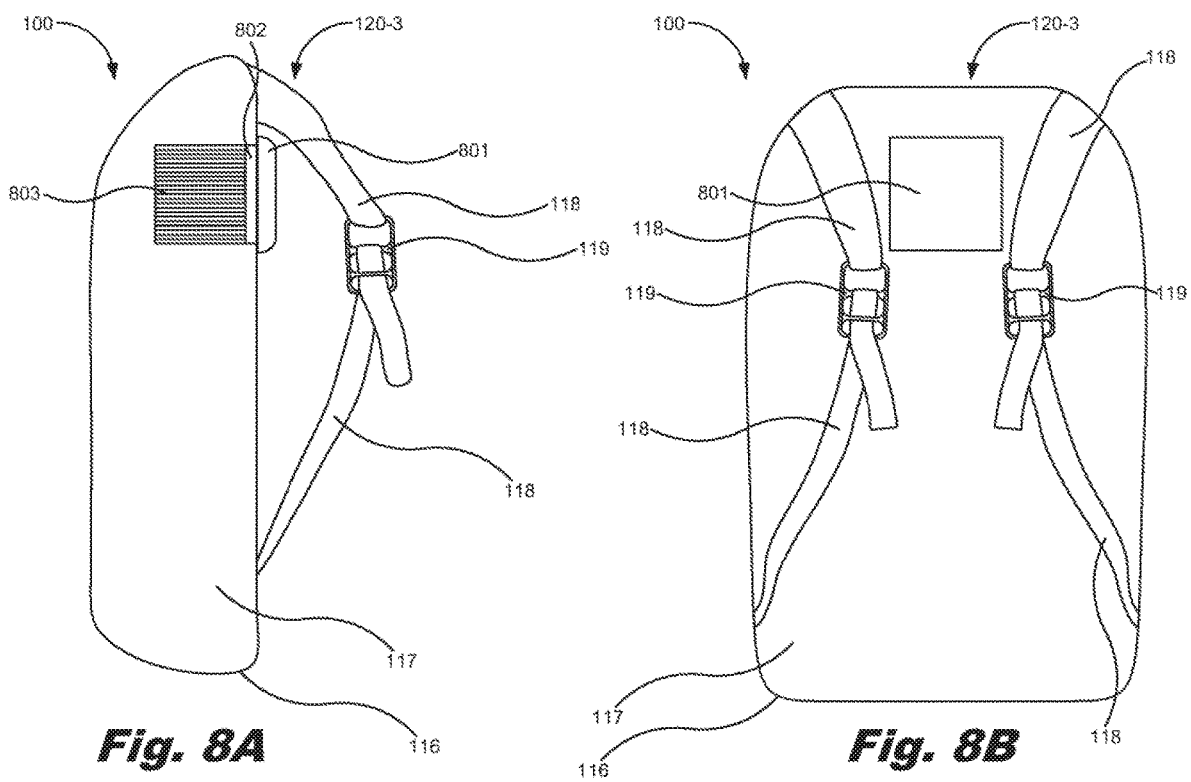

SOMATOSENSORY FEEDBACK SYSTEM

BACKGROUND

A virtual reality environment creates an imaginary environment or replicates a real environment as a virtual, simulated environment. To do this, a combination of software and hardware devices provide auditory, visual, and other sensations to a user to create the virtual reality environment. For example, a virtual reality headset provides auditory and visual sensations that simulate a real environment.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIG. 1 is a block diagram of a somatosensory feedback system, according to one example of the principles described herein.

FIGS. 3A and 3B are side and back views, respectively, of a somatosensory feedback system including a shoulder tap device, according to one example of the principles described herein.

FIGS. 5A and 5B are side and back views, respectively, of a somatosensory feedback system including a shoulder vibration device, according to one example of the principles described herein.

FIGS. 6A and 6B are side and front views, respectively, of a somatosensory feedback system including a wind generation device, according to one example of the principles described herein.

FIGS. 7A and 7B are side and back views, respectively, of a somatosensory feedback system including a strap tightening device, according to one example of the principles described herein.

FIGS. 8A and 8B are side and back views, respectively, of a somatosensory feedback system including a temperature control device, according to one example of the principles described herein.

Throughout the drawings, identical reference numbers designate similar, but not necessarily identical, elements.

DETAILED DESCRIPTION

Figure 2:
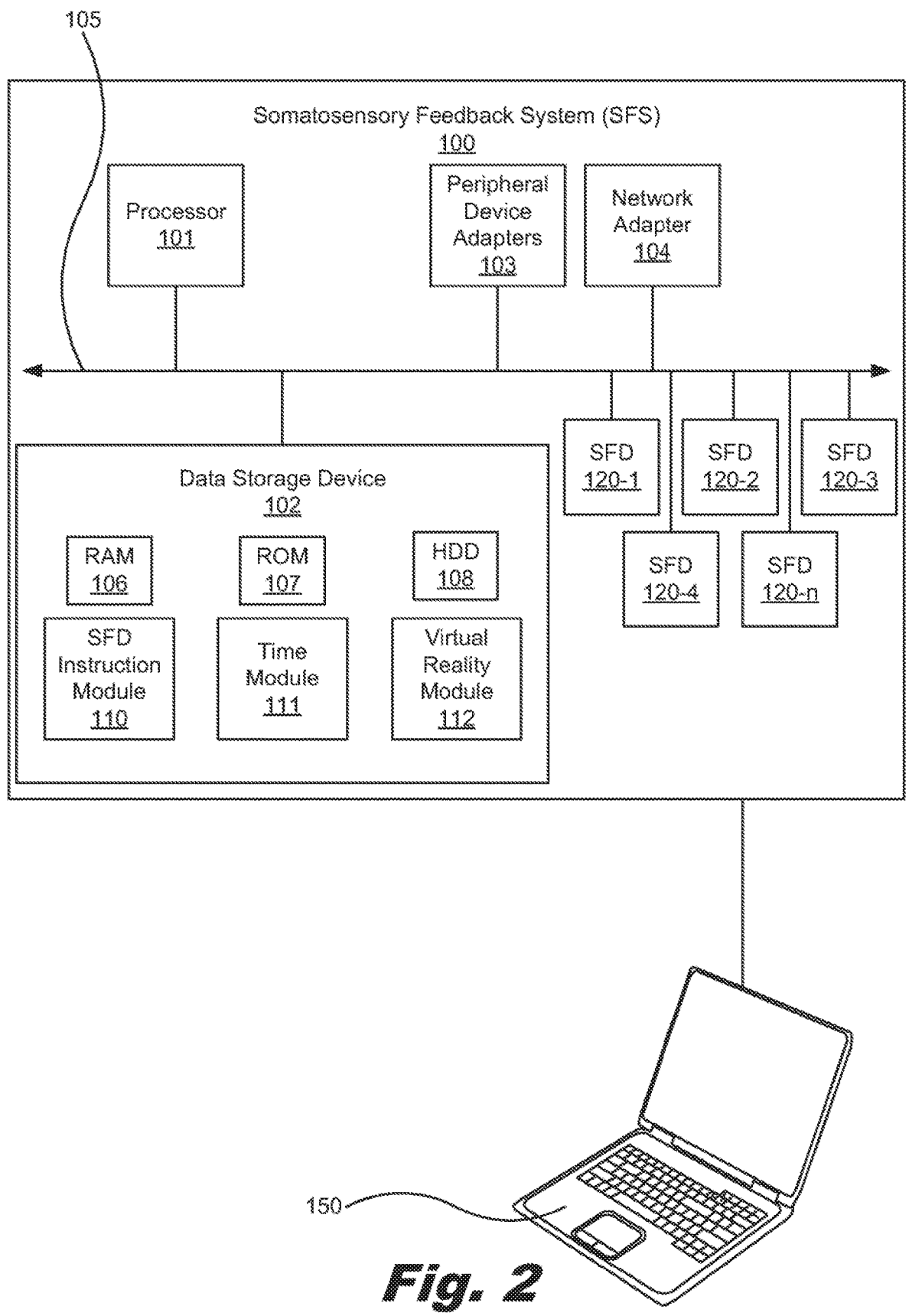
FIG. 2 is a block diagram of a somatosensory feedback system, according to another example of the principles described herein.

Some virtual reality devices are wearable by the user. For example, a virtual reality headset worn over a user's eyes immerses the user in a visual environment. In other examples, a virtual reality system may include an audio system that provides corresponding sounds. Control devices may also be held by the user that may be used by the user to indicate an action within the virtual reality environment. However, the addition of one virtual reality device may make the virtual reality system bulky or may even preclude free movement of the user. Further, the virtual reality system may not provide physical sensations such as urgency, vulnerability, at a level that causes a user to have and immersive experience in the virtual reality environment like those felt in a real environment.

Examples described herein provide a somatosensory feedback system (SFS). The SFS may include at least one somatosensory feedback device to, when actuated, invoke a sensation in a user. In one example, the SFS may instruct the at least one somatosensory feedback device to actuate to indicate a passage of time.

In one example, the at least one somatosensory feedback device may include at least one shoulder strap. Further, the SFS may include at least one somatosensory feedback device that includes at least one shoulder tap device. The shoulder tap device may be coupled to the at least one shoulder strap. The shoulder tap device may include an arm extending from the at least one shoulder strap, and an actuation device coupled to the arm to cause the arm to strike a shoulder of the user.

In another example, the SFS may include at least one somatosensory feedback device that includes at least one shoulder strap tightening device to tighten the at least one shoulder strap. The shoulder strap tightening device may include a motor, a drive shaft drivable by the motor and coupled to the at least one shoulder strap to tighten or loosen the at least one shoulder strap based on a direction in which the motor is driven.

In another example, the SFS may include at least one somatosensory feedback device that includes at least one haptic device coupled to the at least one shoulder strap, the at least one haptic device such as a shoulder vibration device. The shoulder vibration device may include a vibrotactile motor to stimulate mechanoreceptors of the user.

In still another example, the SFS may include at least one somatosensory feedback device that includes at least one wind generation device coupled to the SFS to force air against the user. The wind generation device may include a fan coupled to the SFS, at least two ducts fluidically coupled to the fan through which air travels, and an air switch fluidically coupled between the fan and the at least two ducts to switch air flow within the at least two ducts.

In still another example, the SFS may include at least one somatosensory feedback device that includes at least one a solid-state heat pump coupled to the SFS. The solid-state heat pump may include a thermal pad, a heat sink coupled to the thermal pad; and control logic coupled to the heat sink to programmatically control the operation of the solid-state heat pump to adjust the temperature of the thermal pad.

Examples described herein may also provide a somatosensory feedback system (SFS). The SFS may include a housing a number of straps coupled to the housing to couple the housing to a user. The SFS may also include at least one somatosensory feedback device (SFD) to, when actuated invoke a sensation in a user, and indicate a passage of time.

In one example, the SFD of the SFS includes a solid-state heat pump coupled to the somatosensory feedback system. The solid-state heat pump may include a thermal pad, a heat sink coupled to the thermal pad, and control logic coupled to the heat sink to programmatically control the operation of the solid-state heat pump to adjust the temperature of the thermal pad.

In another example, the SFD of the SFS includes a shoulder strap tightening device to tighten at least one shoulder strap of the somatosensory feedback system. The shoulder strap tightening device may include a motor, and a drive shaft drivable by the motor and coupled to the at least one shoulder strap to tighten or loosen the at least one shoulder strap based on a direction in which the motor is driven.

In still another example, the SFD of the SFS includes a shoulder tap device coupled to the at least one shoulder strap. The shoulder tap device may include an arm extending from the at least one shoulder strap, and an actuation device coupled to the arm to cause the arm to strike a shoulder of the user.

In yet another example, the SFD of the SFS includes a wind generation device coupled to the somatosensory feedback system to force air against the user. The wind generation device may include a fan coupled to the somatosensory feedback system, at least two ducts fluidically coupled to the fan through which air travels, and an air switch fluidically coupled between the fan and the at least two ducts to switch air flow within the at least two ducts. In another example, the wind generation device may include two fans. In this example, each of the two fans may be fluidically coupled to one of the two ducts and controlled individually.

Examples described herein may also provide a computer program product for providing somatosensory feedback. The computer program product may include a computer readable storage medium include computer usable program code embodied therewith. The computer usable program code, when executed by a processor, may instruct at least one somatosensory feedback device to actuate, define at least one actuation parameter of the somatosensory feedback device to invoke an emotion in a user, and define at least one actuation parameter of the somatosensory feedback device to indicate the passage of time.

In one example, the at least one SFD may include a shoulder tap device. In this example, the computer usable program code, when executed by a processor, instructs the shoulder tap device coupled to at least one shoulder strap of a somatosensory feedback system to activate. The shoulder tap device may include an arm extending from the at least one shoulder strap and an actuation device coupled to the arm to cause the arm to strike a shoulder of the user. The computer usable program code, when executed by a processor, may also define at least one actuation parameter of the actuation device to invoke an emotion in a user, instruct the shoulder tap device to actuate based on the passage of time.

In another example, the at least one SFD may include a shoulder strap tightening device. In this example, the computer usable program code, when executed by a processor, instructs the shoulder strap tightening device to tighten the at least one shoulder strap. The shoulder strap tightening device may include a motor, and a drive shaft drivable by the motor and coupled to the at least one shoulder strap to tighten or loosen the at least one shoulder strap based on a direction in which the motor is driven. The computer usable program code, when executed by a processor, may also define at least a tightness provided by the shoulder strap tightening device to invoke an emotion in a user.

In another example, the at least one SFD may include a wind generation device. In this example, the computer usable program code, when executed by a processor, instructs the wind generation device coupled to the somatosensory feedback system to force air against the user. The wind generation device may include a fan coupled to the somatosensory feedback system, at least two ducts fluidically coupled to the fan through which air travels, and an air switch fluidically coupled between the fan and the at least two ducts to switch air flow within the at least two ducts. The computer usable program code, when executed by a processor, may also define at least the strength of the current of air provided by the wind generation device to invoke an emotion in a user.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a somatosensory feedback system (SFS) (100), according to one example of the principles described herein. The SFS (100) may include at least one somatosensory feedback device (SFD) (120). The SFS (100) and its at least one SFD (120) may include any devices that influence the activation of nerve cells within a sentient being's organism including a human body. The SFS (100) and its SFDs (120) may influence nerve cells within the human body called sensory receptors including thermoreceptors, mechanoreceptors, chemoreceptors, and nociceptors that send signals along a chain of nerve cells to the spinal cord where they may be processed by other nerve cells and relayed to the brain for further processing. In a human body, the sensory receptors may be found in a number of parts of the body including, for example, the skin, epithelial tissues, skeletal muscles, bones and joints, internal organs, and the cardiovascular system. The SFS (100) and its SFDs (120) may influence the sensory receptors of an individual in order to cause that individual to mentally react, physically react, or both.

In one example, and in several examples described herein, the SFS (100) may be implemented as a substrate or container carried on an individual's back and secured with at least one strap that secures the sack corer the shoulders. In one example, the form factor of the SFS (100) may include a backpack with two straps so that the user may carry the SFS (100) on his or her back. The SFS (100) may include at least one SFD (120), and, in one example, may include any number of SFDs (120) described herein including all the SFDs (120) described herein and other SFDs (120).

The SFS (100) described herein may be part of a virtual reality system that provides somatosensory feedback to a user that is wearing the SFS (100). The virtual reality system may present or place the user in a virtual reality environment where the SFDs (120) of the SFS (100) provide stimuli to the user that correlates with the virtual reality environment. The timing of the stimuli may be such that the user experiences a myriad of different feelings or emotional such as, for example, the following:
  urgency
  immediacy
  a sense of passage of time
  fear
  surprise
  vulnerability
  fatigue
  claustrophobia
  discomfort
  alarm failure
defeat
calm
comfort
clarity
health
euphoria
excitement
lack of control
tension
a sense that the user has forgotten something
a sense of being constrained
a sense of shortness of breath
a sense of relaxation
a sense of change in the user's environment
a sense of eeriness
a sense of spine chilling
a sense of spaciousness
a sense of freedom
a sense imparted to the user of a desire to lock around and become aware of the users surroundings
a sense of a violation of personal space
other emotions, or combinations thereof. Further, the strength, timing, duration, location, rapidity, rhythmicity or alternatively the arrhythmic nature of the actuation, and pattern of the stimuli provided by the SFDs (120) may be defined and adjustable to provide different sensations or degrees of those sensations.

With this background, more details will be provided in connection with FIG. 2. FIG. 2 is a block diagram of a somatosensory feedback system (SFS) (100), according to another example of the principles described herein. The SFS (100) may be implemented in an electronic device. Examples of electronic devices include virtual reality computing systems, servers, desktop computers, laptop computers, personal digital assistants (PDAs), mobile devices, smartphones, gaming systems, and tablets, among other electronic devices.

The SFS (100) may be utilized in any data processing scenario including, stand-alone hardware, mobile applications, through a computing network, or combinations thereof. Further, the SFS (100) may be used in a computing network, a public cloud network, a private cloud network, a hybrid cloud network, other forms of networks, or combinations thereof. In one example, the methods provided by the SFS (100) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the SFS (100) are executed by a local administrator.

To achieve its desired functionality, the SFS (100) comprises various hardware components. Among these hardware components may be a number of processors (101), a number of data storage devices (102), a number of peripheral device adapters (103), and a number of network adapters (104). These hardware components may be interconnected through the use of a number of busses and/or network connections. In one example, the processor (101), data storage device (102), peripheral device adapters (103), and a network adapter (104) may be communicatively coupled via a bus (105).

The processor (101) may include the hardware architecture to retrieve executable code from the data storage device (102) and execute the executable code. The executable code may, when executed by the processor (101), cause the processor (101) to implement at least the functionality of instructing a number of the SFDs (120) to actuate to convey a number of emotions in a user of the SFS (100), according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein.

The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

Generally, the data storage device (102) may comprise a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the SFS (100) enable the processor (101) to interface with various other hardware elements, external and internal to the SFS (100). For example, the peripheral device adapters (103) may provide an interface to input/output devices, such as, for example, virtual reality devices outside the SFS (100), a display device, a mouse, a keyboard, other input/output devices, or combinations thereof. The peripheral device adapters (103) may also provide access to other external devices such as an external storage device, a number of network devices such as, for example, servers, switches, and routers, client devices, other types of computing devices, and combinations thereof. Communication with the SFS (100) and devices external to the SFS (100) may be provided using wired or wireless communications methods and devices.

The peripheral device adapters (103) may also create an interface between the processor (101) and the display device (109), a printer, or other media output devices. The network adapter (104) may provide an interface to other computing devices such as the computing device (150) within, for example, a network, thereby enabling the transmission of data between the SFS (100) and other devices located within the network.

The SFS (100) further comprises a number of modules used in the implementation of instructing a number of the SFDs (120) to actuate to convey a number of emotions in a user of the SFS (100). The various modules within the SFS (100) comprise executable program code that may be executed separately. In this example, the various modules may be stored as separate computer program products. In another example, the various modules within the SFS (100) may be combined within a number of computer program products; each computer program product comprising a number of the modules.

The SFS (100) may include a SFD instruction module (110) to, when executed by the processor (101), instruct the SFDs (120-1, 120-2, 120-3, 120-4, 120-n, collectively referred to herein as 120) to actuate. The SFD instruction module (110) may instruct the SFDs (120) regarding the strength, timing, duration, location, rapidity, rhythmicity or alternatively the arrhythmic nature of the actuation, and pattern of actuation. Further, the SFD instruction module (110) may instruct the SFDs (120) based on an emotion or sensation intended to be conveyed to the user. In one example, instructions regarding the strength, timing, duration, location, rapidity, and rhythmicity or alternatively the arrhythmic nature of the actuation, pattern of actuation of the SFDs (120) as well as which SFD (120) to actuate may be received from a computer program that is being executed to provide a virtual reality environment for the user. In this example, the SFS (100) executes the SFD instruction module (110) based on instructions received from, for example, the computing device (150), and based on the virtual reality program being executed by the computing device (150) or another computing device.

The SFS (100) may include a time module (111) to, when executed by the processor (101), activate at least one of the SFDs (120) at after a predefined time period to indicate to a user the passage of time. In some examples, when immersed in a virtual reality environment, a user may find it difficult to appreciate the passage of time since the user may not have access to a timepiece or the user may not appreciate the passage of time when in such an environment. Thus, a user may wish to be informed when a certain amount of time has passed between commencement of his or her use of the SFS (100), the virtual reality system, or combinations thereof. The time module (111), when executed by the processor (101), may actuate at least one of the SFDs (120) to inform the user of the passage of time. In one example, the SFDs (120) may be actuated through the execution of the time module (111) at time intervals during the use of the SFS (100). In this example, the SFDs (120) may be actuated, for example, every 20 minutes. This time interval may be defined by the user and input to the SFS (100) to allow for the SFS (100) to execute the time module (111) based on the user-defined time intervals. In another example, a parent of a user of the device may wish to manage the time the user is interacting with the virtual reality environment, its associated devices, the SFS (100), or combinations thereof. In this example, the parent may define the duration of time the user has to interact with the SFS (100), and the SFDs (120) may be actuated as executed by the time module (111) based on the duration of time defined by the parent. More details regarding the use of the time module (111) are provided here in connection with the individual types of SFDs (120).

The SFS (100) may include a virtual reality module (112) to, when executed by the processor (101), actuate at least one of the SFDs (120) based on instructions received from an exterior source such as the computing device (150). As the user interacts with the virtual reality environment in which the SFS (100) is implemented, the user may experience a number of events within the virtual reality environment that may be augmented by actuation of at least one of the SFDs (120). For example, in a situation where the user is participating in a virtual reality environment where the user is experiencing a nighttime graveyard scenario, at a moment when a ghost appears, for example, at least one of the SFDs (120) may be actuated to invoke a desired somatosensory feedback to the user's person. In this manner, the user may experience a more realistic and enjoyable experience within the virtual reality system due to the actuation of the SFDs (120) in connection with the virtual reality environment. In one example, the computing device (150) may be the device that presents the virtual reality environment to the user. In this example, the SFS (100) may transmit data to the computing device (150) to inform the computing device (150) as to what types of SFDs (120) are included within the SFS (100) and the functionality of the SFDs (120). Further, the computing device (150) may transmit data to the SFS (100) regarding when the SFDs (120) may be actuated and in what manner the SFDs (120) are actuated to invoke an intended feeling or emotion in the user.

As mentioned herein, the SFS (100) may further include a number of SFDs (120-1, 120-2, 120-3, 120-4, 120-n. FIG. 2 indicates that the SFS (100) may include n number of SFDs (120) which indicates that any number of SFDs (120) may be included in the SFS (100). The SFDs (120) may include, for example, a should tap device, a haptic or vibration device, a wind generation device, a strap tightening device, a heating or cooling device, other somatosensory feedback devices, or combinations thereof. Examples of SFDs (120 that may be included in the SFS (100) will now be described in connection with FIGS. 3A through 9B. In the examples of FIGS. 3A through 9B, the SFS (100) is incorporated into a backpack (116) or similar form factor that includes a housing (117) and a number of straps (118). A number of fasteners (119) may be included as part of the straps (118) to allow the straps (118) to couple two portions of a strap (118) to another, and to allow for adjustment of the length of the straps (118) to fit around the body of the user. In this manner, the backpack (116) is coupled to the back of the user, and the SFDs (120) are included on portions of the backpack (116) to provide somatosensory feedback to a user that is wearing the SFS (100) at the portions of the user's person where the SFDs (120) are located.

Figure 4A:
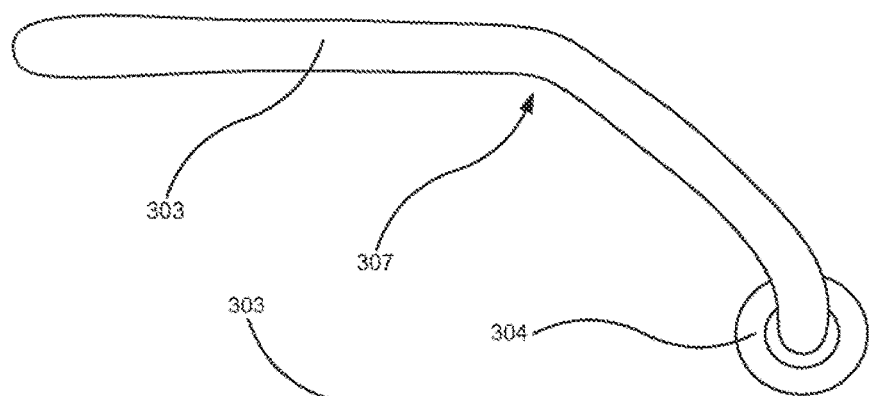
FIGS. 4A and 4B are top and side views, respectively, of an arm of the shoulder tap device of FIGS. 3A and 3B, according to one example of the principles described herein.
Figure 4B:
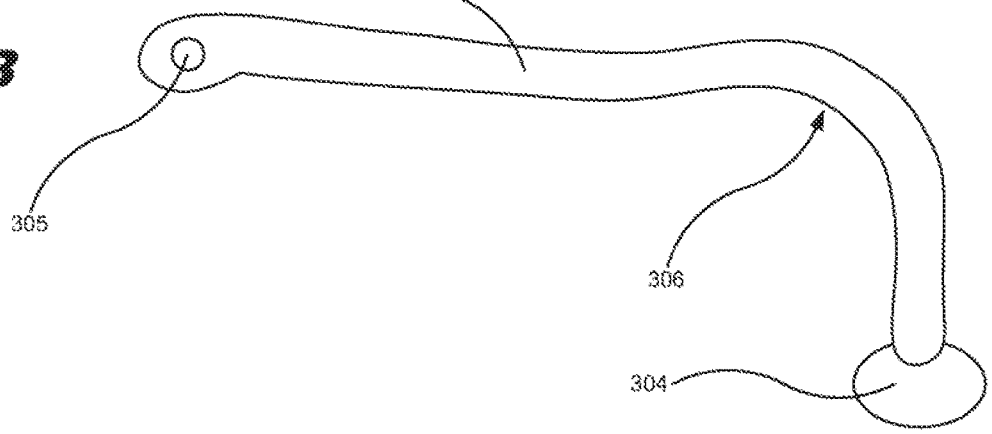

FIGS. 3A and 3B are side and back views, respectively, of a somatosensory feedback system (100) including a shoulder tap device (120-1), according to one example of the principles described herein. Further, FIGS. 4A and 4B are top and side views, respectively, of an arm (303) of the shoulder tap device (120-1) of FIGS. 3A and 3B, according to one example of the principles described herein. A shoulder tap device (120-1) may be included on either or both straps (118) and are electrically and electronically coupled to the elements of the SFS (100).

The shoulder tap device (120-1) may include a bracket (301) coupled to the strap (118) near a portion where the strap (118) would contact the shoulder area of the user. The bracket (301) may be coupled to the strap (118) using a fastener. In one example, the bracket (301) includes a number of holes defined therein and separated by, in one example, at least two inches. A number of fasteners may be inserted through the holes and into the strap (118) to couple the bracket (301) to the strap (118). The wide separation of connection points to the strap (118) together with a firm attachment using the fasteners creates a rigidity that allows the shoulder tap device (120-1) to provide a strong touch sensation.

A servomotor (302) may be coupled to the bracket (301) using any type of fastener. The servomotor (302) may be any rotary or linear actuator that allow of precise control of angular or linear position, velocity, and acceleration. In the example of FIGS. 3 and 4, an arm (303) may be coupled to the servomotor (302). The arm (303) may be coupled to an output axel of the servomotor (302) at an attachment point (305) of the arm (303). The arm (303) may be bent at point (306) so as to reach down toward the shoulder and may have adequate clearance from the strap (118) to distribute the load the actuation of the arm (303) produces at a desired area of the shoulder or neck of the user. The arm (303) is also bent diagonally as shown at point (307) in FIG. 4A to cause the arm (303) to clear the area covered by the shoulder strap (118) itself. In one example, a soft foot (304) may be coupled to the end of the arm (303) to distribute the load the actuation of the arm (303) produces over the approximate area of a finger in order to approximate the sensation of another individual tapping the user on the shoulder.

The precision movement provided by the servomotor (302) serves to move the arm (303) such that it taps a user on an area of the shoulder including the back, front, or side of the shoulder, or other area of the body based on a desired or programmed strength, timing, duration, location, rapidity, rhythmicity or alternatively the arrhythmic nature of the actuation, pattern, or combinations thereof. The shoulder tap device (120-1) may be positioned on the straps (118) such that the arm (303) is positioned to tap the user in a location that isn't covered by the strap (118).

The servomotor (303) may be programmatically controlled by, for example, the SFD instruction module (110), the time module (111), the processor (101), the computing device (150) via the SFS (100), other devices, or combinations thereof in order to move the arm (303). In one example, the sensation of the arm (303) touching the user's shoulder area feels like a person tapping the user with their finger. This feedback provided by the shoulder tap device (120-1) may be performed with varying strength, timing, duration, location, rapidity, rhythmicity or alternatively the arrhythmic nature of the actuation, and pattern, and may create an interruption in the virtual reality environment by tapping the user on the shoulder with a force similar to how another person might tap the user in order to gain their attention. Further, the shoulder tapping device (300) may induce feelings of surprise. Further, the acting effect of the shoulder tapping device (300) may be a sense of a violation of personal space, and may range from a simple request to look around to a panic-laden sense of being attacked depending on the context of the virtual reality environment the user is currently experiencing. In any case the actuation of the shoulder tap device (120-1) is impossible to ignore, and gives the user a sense that something immediate is to be done.

FIGS. 5A and 5B are side and back views, respectively, of a somatosensory feedback system (100) including a shoulder vibration device (120-2), according to one example of the principles described herein. The shoulder vibration device (120-2) depicted in the SFS (100) of FIGS. 5A and 5B may be any device that produces a vibration of the straps (118) that may be felt by the user as he or she wears the SFS (100). In this manner, the shoulder vibration device (120-2) stimulates mechanoreceptors of the user. In one example, the shoulder vibration device (120-2) may include an electric motor connected to an off-center weight that produces a vibration as the mass of the off-center weight shifts. The vibration produces serves as haptic or kinesthetic feedback to the user.

In one example, the electric motors of the shoulder vibration devices (120-2) are electrically and electronically coupled to the elements of the SFS (100), and may be programmatically controlled to provide vibrations of different strength, timing, duration, location, rapidity, rhythmicity or alternatively the arrhythmic nature of the actuation, and pattern of the stimuli. The electric motors of the shoulder vibration devices (120-2) may be programmatically controlled by, for example, the SFD instruction module (110), the time module (111), the processor (101), the computing device (150) via the SFS (100), other devices, or combinations thereof in order to actuate the shoulder vibration devices (120-2). Each shoulder vibration device (120-2) may be individually controlled so the user may get feedback on only the left strap (118) or only the right strap (118).

In one example, the shoulder vibration device (120-2) may be positioned on the straps (118) such that they are at a position where the maximum load of the shoulder vibration device (120-2) is transferred from the straps (118) to the shoulders of the user. This places the shoulder vibration device (120-2) in close contact with the skeletal structures of the user's shoulder creating a strong sense of vibration.

In one example, the strength of the sensation may be interpreted as a sense of urgency by the user. In one example, a single vibration of the shoulder vibration device (120-2) may indicate a first or less-important notification, and multiple vibrations of approximately 250 milliseconds (ms) 2 Hertz (Hz) may be used to reinforce the notification or provide a countable notification. Rapidly alternating the vibration of the shoulder vibration device (120-2) of about 100 ms between both shoulders on the straps (118) at 10 Hz may be used to represent a notification of the highest urgency. Further, continuous vibration of the shoulder vibration device (120-2) at about 250 ms at 2 Hz may be used to indicate a persistent problem that must be acknowledged.

In one example, a plurality of shoulder vibration devices (120-2) may be positioned along the straps (118) or any other place on the SFS (100) where the SFS (100) comes into contact with the user's body. In one example, stronger or more intense shoulder vibration devices (120-2) may be placed at a point where a maximum load on the straps (118) is interfaced with the portion of the user's shoulder to the user's skeletal structure of his or her shoulder to create a strong haptic vibration. In this example, the strength, timing, duration, location, rapidity, rhythmicity or alternatively the arrhythmic nature of the actuation, and pattern of the stimuli from the shoulder vibration device (120-2) may invoke a sense of urgency in the user. When adjusted to the strongest effect, the shoulder vibration device (120-2) may also induce a sense of failure or defeat.

In another example, a number of relatively weaker shoulder vibration devices (120-2) may be placed on the back portion of the SFS (100) within three inches of the user's spine. This places the shoulder vibration devices (120-2) where they can be noticed but where they will not interrupt a train of thought. In this example, relatively lighter, shorter, and slower vibration patterns may induce a sense that the user has forgotten something. Further, in this example, stronger and longer vibration patterns may induce a sense of vulnerability or of not being in control.

FIGS. 6A and 6B are side and front views, respectively, of a somatosensory feedback system (100) including a wind generation device (600), according to one example of the principles described herein. The wind generation device (120-3) is electrically and electronically coupled to the elements of the SFS (100). The wind generation device (120-3) may include a stabilizer plate (601) to stabilize and hold other elements of the wind generation device (120-3) within the SFS (100). A fan housing (602) may be coupled to the stabilizer plate (601). The fan housing (602) houses a fan (603). In one example, the fan is a centrifugal fan that, when rotated, pulls air into the wind generation device (120-3) through a fan plate (605). A motor (604) is coupled to the fan (603), and is instructed by the SFS (100) as to strength, timing, duration, rapidity, rhythmicity or alternatively the arrhythmic nature of the actuation, and pattern of actuation of the motor (604) so as to actuate the fan (603) as instructed.

Once the motor (604) is actuated, the fan (603) forces air to flow out a fan outlet (606), and into an air switch (607). The air switch (607) includes a blade (608) that is able to turn about a pivot (609) as instructed by the SFS (100) and other devices and in the direction indicated by arrow (620). The air switch (607) is able to force air into one or both of the air switch outlets (610) and into two air ducts (611) based on the position of the blade (608) within the air switch (607). The blade (608) may be moved about the pivot (609) using, for example, a servomotor (621) as instructed by the SFS (100). The servomotor (621) may be instructed by the SFS (100) as to timing, duration, rapidity, and pattern of actuation of the blade (608) so as to cause air to flow through one or both of the air switch outlets (610) and into two air ducts (611) as instructed. In one example, the blade (608) may be actuated to three different positions. In this example, the first position may be a position where the blade (608) is turned to the left as viewed in FIG. 6B to allow for air to flow into the right air switch outlet (610). A second position may be a position where the blade (608) is turned to the right as viewed in FIG. 6B to allow for air to flow into the left air switch outlet (610). A third position may be a position where the blade (608) is turned to the center as viewed in FIG. 6B to allow for air to flow into the right and left air switch outlets (610). In this manner, the blade (608) may cause air to flow through the left air switch outlet (610), through the right air switch outlet (610), or both.

The air ducts (611) may be coupled together along a central portion of the back of the SFS (100) using a duct plate (613). In the example of FIGS. 6A and 6B, the duct plate (613) may be located on an exterior surface of the SFS (100) as the two air ducts (611) exit the SFS (100). In one example, the fan plate (605) and fan (603), and the duct plate (613) are coupled to the SFS (100) at locations where the wind generation device (120-3) transects the material of the SFS (100) in order to stabilize the edge of the material of the SFS (100).

In one example, one air duct (611) may be directed to the left and the other air duct (611) may be directed to the right as depicted in FIG. 6B. Air vents (612) may be coupled to the end of the air ducts (611) to allow for the air to be directed at a portion of the user's body such as, for example, their neck, shoulders, face, other body parts, or combinations thereof. In one example, the air ducts (611) and the air vents (612) may be coupled to the exterior of the SFS (100) to ensure that the air ducts (611) do not move from their position, to ensure that the user is not harmed by the moving air ducts (611), and to ensure that the air is vented in an intended direction. Further, in one example, the arrangement of the air ducts may be made to be as straight and of as large a diameter as possible in the space available within and on the SFS (100) to allow for air to flow at varying rates.

Further, in one example, the air ducts (611) may be oriented around the front of the SFS (100) such that the air may travel up the front of the user. In this example, the air ducts (611) may be made longer to extend around the front of the SFS (100) and may be coupled to, for example, the straps (118). In another example, the wind generation device (120-3) may include two fans (603). In this example, each of the two fans (603) may be fluidically coupled to one of the two air ducts (611) and controlled individually by the SFS (100) in the manner described herein.

In one example, the wind generation device (120-3) provides a sensation of air flow around the user. The wind generation device (120-3) may invoke a sense of change in the environment, inducing feelings of spaciousness and freedom. Further, as the airflow is directed onto, for example, the neck of the wearer, the sensation may feel cool and comfortable like opening a refrigerator door on a hot day. Stronger air currents produced by the wind generation device (120-3) and directed alternately at one side of the neck and then the other may feel like a shifting sea breeze inducing feelings of freedom and spaciousness.

Further, in some virtual reality environments, air blowing on the neck may also invoke a sensation of clarity and health when provided a virtual reality experience that is consistent with those feelings. For example, in a virtual reality role playing game, the wind generation device (120-3) may be used to indicate that a healing spell has taken effect. In contrast, where the feelings induced by the wind generation device (120-3) are in contrast to the virtual reality environment, the result may be an eerie sensation. For example, blowing air on the user's neck when in a virtual reality graveyard may induce feelings that are disturbing or spine chilling.

FIGS. 7A and 7B are side and back views, respectively, of a somatosensory feedback system (SFS) (100) including a strap tightening device (120-4), according to one example of the principles described herein. The strap tightening device (120-4) is electrically and electronically coupled to the elements of the SFS (100). The strap tightening device (120-4) may include a frame (707) to stabilize and hold other elements of the strap tightening device (120-4) within the SFS (100).

Two housings (701) may be coupled to the frame (707) and positioned at opposite sides of the SFS (100). A spool (702) coupled to a drive shaft (703) may be included within each of the housings (701). A cord (708) may be coupled between each spool (702) and the straps (118) and fed through a hole defined within the housing (701). In this manner, the straps (118) are indirectly coupled to the SFS (100) via the cord (708), the spool (702), the housing (701) and the frame (707). The drive shaft (703) may be seated within a bearing (704) included in the strap tightening device (120-4) between each of the housings (701) and the frame (707) to allow the drive shaft (703) to turn within the bearing (704) smoothly and with reduced friction.

The drive shaft (703) receives its rotational movement from a motor (705). The motor transfers motion to the drive shaft (703) via a worm gear assembly (706) couple between the motor (705) and the drive shaft (703). The motor (705) and the worm gear assembly (706) may be coupled to the frame (707) for support. The worm gear assembly may include a worm that drives a worm wheel, and provides for a vertical rotation of the worm due to the activation of the motor (705) to be transferred into a horizontal rotation of the drive shaft (703) due to the worm wheel being coupled to the drive shaft. In this manner, the activation of the motor (705) results in the collection or release of the cord (708) into and out of the spool (702). In this manner, the straps (118) may be tightened or loosened. The tightening and loosening of the straps (118) may be based on instructions received from the SFS (100) and other devices such that the strap tightening device (120-4) is programmatically controlled to tighten or loosen the straps (118).

Tightening of the straps (118) via the strap tightening device (120-4) may invoke a feeling of the user being constrained, while the loosening the straps (118) may invoke a feeling of relaxation. In one example, the motor (705) may be actuated to pull the straps (118) tight enough so that they both restrict free arm movement and invoke a sense of constriction or tension in the user.

The strap tightening device (120-4) may be used to invoke a sense of constriction or tension. At opposite extremes, the straps (118) may create feelings verging on fatigue or claustrophobia. Further, when the straps (118) are made very loose it feels as though the SFS (100) may slip off the shoulders of the user at any time, and the weight of the SFS (100) becomes poorly balanced simulating the feeling of stumbling fatigue. As the straps (118) are tightened using the strap tightening device (120-4), the constriction creates feelings of confinement and heightened tension. At a tightest setting, the straps (118) may invoke in the user a feeling of constrained movement, that it is harder to breathe, or that it is harder to reach for objects. Within a relevant virtual reality environment and scenario, the user might feel as though he or she has been pulled up short, such as, for example, when being pulled back by a blossoming parachute or when being restrained by a seatbelt during an automobile crash. In another example, the user may feel trapped and claustrophobic having been thrown into a dungeon or jail cell. In still another example virtual reality scenario, the user may feel short of breath as if they were underwater; or fatigued as if after a long day of hiking.

FIGS. 8A and 8B are side and back views, respectively, of a somatosensory feedback system including a temperature contra device (120-5), according to one example of the principles described herein. The temperature control device (120-5) is electrically and electronically coupled to the elements of the SFS (100). The temperature control device (120-5) may include a thermal pad (801) coupled to an outer surface of the SFS (100). In one example, the thermal pad (801) is located towards the top of the SFS (100) so that the thermal pad (801) comes into contact with the user's upper back and shoulder area. However, any number of thermal pad (801) may be included within the SFS (100) and may be coupled to other portions of the SFS (100) to cause a heating and/or cooling sensation at those areas of the user's body that come into contact with the thermal pad (801).

To heat and cool the user's body, the temperature control device (120-5) includes both a heating element (802) and a heat sink (803) thermally coupled to the thermal pad (801). In one example, the temperature control device (120-5) does not include the heating element (802). In this example, the heat sink (803), being thermally coupled to the thermal pad (801) may be used to cool the thermal pad (801) while allowing for the user's body heat to heat the thermal pad (801).

The thermal pad (801) may be made of any material that is capable of thermal conduction such as, for example, metals and metal alloys. In examples where the heating element (802) is included in the temperature control device (120-5), the heating may be electrically and electronically coupled to the elements of the SFS (100) so that the SFS (100) may programmatically control the actuation of the heating element (802). The heating elements (802), when activated, heats up, and thermally conducts that heat to the thermal pad (801), which, in turn, may be felt by the user. In order to cool the thermal pad (801), the heating element (802) (if included within the temperature control device (120-5)) is left inactivated, and the heat sink (803) causes heat to dissipate from the thermal pad (801). The heat sink (803) may be any a passive heat exchanger that transfers heat generated by the heating element (802) or the user's body to a fluid medium such as the air within and exterior to the SFS (100) where it is dissipated away from the thermal pad (801), thereby allowing for the cooling of the thermal pad (801). In one example, the heat sink (803) may be a solid-state heat pump. Further, in one example, the heating element (802) and the thermal pad (801) may be embodied as a single element.

In some virtual reality environments and scenarios, the heating and cooling sensations in the extreme may invoke a feeling of discomfort for the user. Further, in other virtual reality environments and scenarios cooling of the user's back may invoke a shiver-down-the-spine sensation or relaxation. Further, the heating and cooling temperatures provided by the temperature control device (120-5) may be used in correlation with the temperature of virtual reality environments and scenarios such that a virtual reality environment such as a desert may be accompanied by a heating of the thermal pad (801) while a virtual reality environment such as an arctic tundra may be accompanied by a cooling of the thermal pad (801). In this manner, the virtual reality environments and scenarios may be augmented by corresponding sensations that make the virtual reality experience more life-like.

In one example, any and all of the various somatosensory feedback devices (SFDs) (120) may be included within the somatosensory feedback system (SFS) (100) in order to allow the user to experience a wide range and types of somatosensory feedback in connection with the user of the virtual reality environment in which the SFS (100) is used. Having described the various SFDs (120) within the SFS (100) and their function, the use of these devices in connection with the indication of the passage of time will now be described.

The SFS (100) and its SFDs (120) may be used to indicate the passage of time along with invoking emotional states and sensations in the user. In some examples, a user may be so immersed in the virtual reality environment, that time may slip by the user faster than he or she realizes. This may be particularly true in connection with the use of a virtual reality system by a child or adolescent whose use of the associated virtual reality system may be monitored by a parent or guardian. The SFS (100) may be used to indicate to the user a passage of an amount of time.

In one example, the shoulder tap device (120-1) may be used to indicate the passage of a period of time. In one example, time feedback may be indicated by taps provide by the shoulder tap device (120-1). In one example, the more time that passes, the number of taps may increase. In one example, the user may set how many taps are received based on the amount of time that passes. The number of taps may vary linearly with the amount of time passing. For example, one tap may be provided by the shoulder tap device (120-1) after five minutes have passed, two taps after ten minutes have passed beyond the first five-minute indication. This feedback may also indicate time passing by indicating a concept of urgency. In this example, a user approaching a time limit may be vigorously tapped to indicate they need to pay attention. In another example, a single tap may indicate a gentle nudge to pay attention.

The shoulder vibration device (120-2) may also be used to indicate the passage of time. In this example, temporal feedback may be provided by linearly correlating buzzes with time passed. For example, one buzz may indicate the passage of five minutes of time have passed, and two buzzes may indicate the passage of ten minutes beyond that five-minute indication. In one example, the temporal feedback may also indicate time passage by indicating urgency. For example, rapid vibrations of the shoulder vibration device (120-2) on alternating shoulders may invoke in the user a feeling similar to an alarm going off. This may be used to indicate a time limit has been reached. In addition to periodicity and pattern, the strength of the vibrations provided by the shoulder vibration device (120-2) may can also indicate time passage where low vibration feedback indicates a small amount of time passing, and the strength of the vibrations provided by the shoulder vibration device (120-2) becomes greater as more time passes.

The wind generation device (120-3) may also be used to indicate to the user the passage of time. In this example, the temporal feedback may be given by providing wind sensations at user-defined time intervals. In another example, the strength of the wind feedback may be varied to indicate the passage of time. In this example, as time passes, the wind generation device (120-3) may provide stronger and stronger currents of air.

In another example, the straps (118) of the strap tightening device (120-4) may also be used to indicate the passage of time. In one example, the straps (118) may be steadily tightened as time passes. As more time passes, a user may become more constrained by the straps (118). This temporal action may be useful for providing feedback about approaching time limits. Passage of time may also be indicated by periodically tightening or loosening the straps (118). For example, every five minutes, the straps (118) may tighten by a discernable amount.

The temperature control device (120-5) may also be used to indicate the passage of time. In this example, temporal feedback may be provided by heating or cooling the thermal pad (801) of the temperature control device (120-5) periodically. In this example, the cooling of the thermal pad (801) may serve to ensure that the user detects a subsequent heating of the thermal pad (801). An approaching time limit may be indicated by starting the thermal pad (801) at a cooled state, and slowing increasing the heat to a user-defined maximum.

In one example, the various SFDs (120) may be used alone or together in any combination to indicate the passage of time. In this manner, the user may experience varying levels of abnormality in the virtual reality environment that would lead the user to become keenly aware of the abnormality and become aware of the environment outside of the virtual reality environment. In this manner, the user may be reminded that he or she has spent some amount of time in the virtual reality environment, and may remove him or herself from the virtual reality environment.

Figure 9:
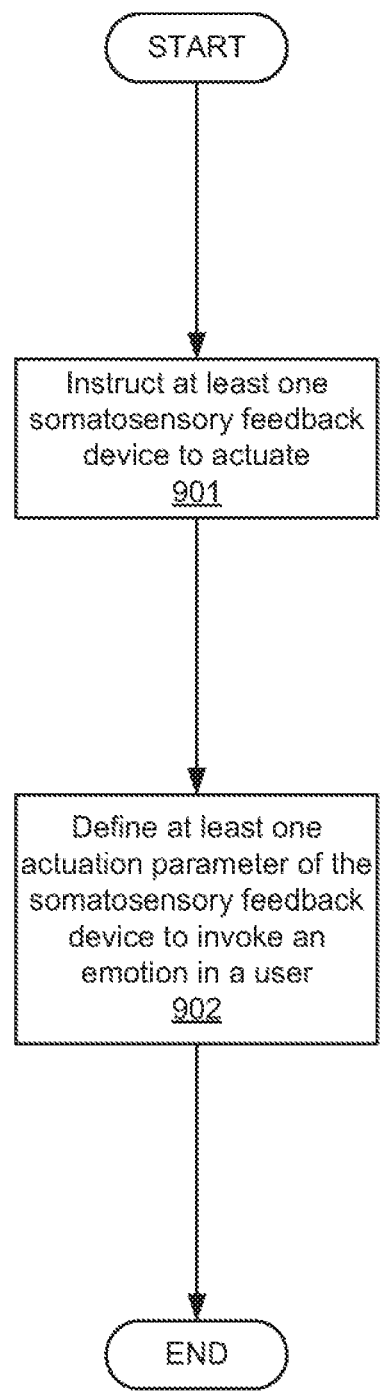
FIG. 9 is a flowchart depicting a method of providing somatosensory feedback, according to one example of the principles described herein.

FIG. 9 is a flowchart depicting a method of providing somatosensory feedback, according to one example of the principles described herein. The method of FIG. 9 may begin by instructing (block 901) at least one SFD (120) to actuate. The at least one SFD (120) may be any SFD (120) described herein or combinations thereof.

The method may also include defining (block 902) at least one actuation parameter of the SFD (120) to invoke an emotion in the user. The at least one actuation parameter of the SFD (120) may include, for example, the strength, timing, duration, location, rapidity, rhythmicity or alternatively the arrhythmic nature of the actuation, pattern of actuation, other actuation parameters, or combinations thereof. The actuation parameters may be defined and adjustable to provide different sensations or degrees of those sensations.

Figure 10:
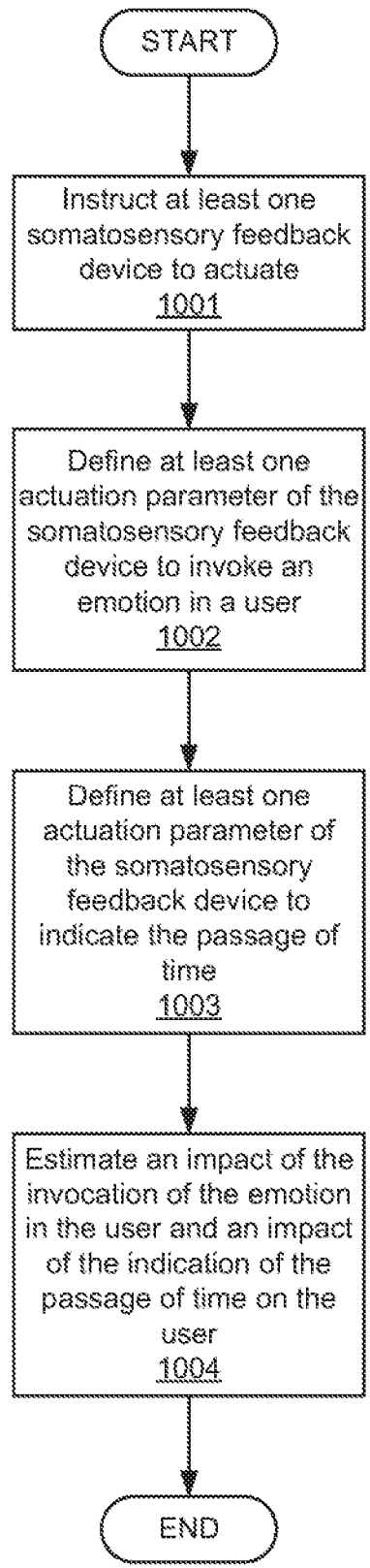
FIG. 10 is a flowchart depicting a method of providing somatosensory feedback, according to another example of the principles described herein.

FIG. 10 is a flowchart depicting a method of providing somatosensory feedback, according to another example of the principles described herein. The method of FIG. 10 may begin by instructing (block 1001) at least one SFD (120) to actuate. The at least one SFD (120) may be any SFD (120) described herein or combinations thereof.

The method may also include defining (block 1002) at least one actuation parameter of the SFD (120) to invoke an emotion in the user. The at least one actuation parameter of the SFD (120) may include, for example, the strength, timing, duration, location, rapidity, rhythmicity or rhythmic nature of the actuation, pattern of actuation, other actuation parameters, or combinations thereof. The actuation parameters may be defined and adjustable to provide different sensations or degrees of those sensations.

The method of FIG. 10 may further include defining (block 1003) at least one actuation parameter of the SFD (120) to indicate the passage of time. As described herein, any of the SFDs (120) or combinations thereof may be used to indicate the passage of time. This allows the user to appreciate the time spent in the virtual reality environment.

The method of FIG. 10 may further continue by estimating (block 1004) the impact of the invocation of the emotion in the user and the impact of the indication of the passage of time on the user. In one example, the impact of the invocation of the emotion in the user and the impact of the indication of the passage of time on the user may include detecting movements of the user before, during, and after the actuation of the SFDs (120) to determine how the user responded to the actuations. In this manner, the SFS (100) may ensure that the actuation of the SFDs (120) result in the emotional impact and the identification of the indication of the passage of time to the user. In one example, if these goals do not result in a perceived change in action by the user, the SFS (100) may alter the actuation parameters of the SFDs (120) in order to achieve these goals.

In the example of 10, blocks 1002 and 1003 may be performed simultaneously or in parallel. In this example, a single actuation of the SFDs (120) may result in the emotional impact and the identification of the indication of the passage of time on the user. In another example of FIG. 10, blocks 1002 and 1003 may be performed in sequence or in series to invoke two separate impacts to the user.

The SFDs (120) of the SFS (100) may be used for other purposes, in addition to providing temporal feedback and invoking emotions in the user. For example, a notification to one or the other shoulder using at least one of the SFDs (120) while in the virtual reality environment may be used to indicate the relative direction that the user needs to turn within the virtual reality environment to find the source of a virtual problem or obtain a goal within the virtual reality environment. In another example, a tap from the shoulder tap device (120-1) may be used to indicate that a person has entered the room where the user is within the virtual reality environment or outside the virtual reality environment.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (101) of the somatosensory feedback system (100), the computing device (150), elements associated with a virtual reality environment, or other programmable data processing apparatus, or combinations thereof, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a somatosensory feedback system (SFS). The SFS may include at least one somatosensory feedback device to, when actuated, invoke a sensation in a user. In one example, the SFS may instruct the at least one somatosensory feedback device to actuate to indicate a passage of time. The examples described herein provide a user with a more immersive and emotion invoking experience within a virtual reality system. Further, the example, described herein also provide for a user to be notified of the passage of time outside the virtual reality system.

The preceding description has been presented to illustrate and describe examples of the principles described. This description is not intended to be exhaustive or to limit these principles to any precise form disclosed. Many modifications and variations are possible in light of the above teaching.

What is claimed is:

1. A somatosensory feedback system comprising:
   a virtual reality system to immerse a user in a virtual reality setting;
   a somatosensory feedback device to, when actuated, invoke a sensation in the user, the sensation corresponding to an event occurring in the virtual reality setting of the virtual reality system;
   wherein the somatosensory feedback system instructs the somatosensory feedback device to actuate to indicate to the user a passage of time;
   wherein the somatosensory feedback device comprises:
   a solid-state heat pump coupled to the somatosensory feedback system comprising:
   a thermal pad;
   a heat sink coupled to the thermal pad; and
   control logic coupled to the heat sink to programmatically control the operation of the solid-state heat pump to adjust the temperature of the thermal pad.

2. The somatosensory feedback system of claim 1, wherein the somatosensory feedback device comprises:
   at least one shoulder strap;
   a shoulder strap tightening device to tighten the at least one shoulder strap, the shoulder strap tightening device comprising:
   a motor;
   a drive shaft drivable by the motor and coupled to the at least one shoulder strap to tighten or loosen the at least one shoulder strap based on a direction in which the motor is driven.

3. The system of claim 2, wherein the shoulder strap tightening device is to operate the drive shaft concurrently with a stimulus being applied to the user that is associated with a user response that is enhanced by loosening or tightening of the at least one should shoulder strap.

4. The somatosensory feedback system of claim 1, wherein the somatosensory feedback device comprises:
   a wind generation device coupled to the somatosensory feedback system to force air against the user, the wind generation device comprising:
   a fan coupled to the somatosensory feedback system;
   at least two ducts fluidically coupled to the fan through which air travels; and
   an air switch fluidically coupled between the fan and the at least two ducts to switch air flow within the at least two ducts.

5. The system of claim 4, wherein the air switch is moveable between three positions: a first position directing air from the fan to a first of the at least two ducts, a second position directing air from the fan to a second of the at least two ducts and a third position allowing air from the fan into both of the at least two ducts.

6. The system of claim 4, wherein the wind generation device is to operate the air switch to alternately direct air flow, through the ducts, to the user from different directions.

7. The system of claim 1, further comprising a time module to indicate expiration of a predetermined duration of time to the user using the somatosensory feedback device.

8. A somatosensory feedback system comprising:
   a virtual reality system to immerse a user in a virtual reality setting;
   a somatosensory feedback device to, when actuated, invoke a sensation in the user, the sensation corresponding to an event occurring in the virtual reality setting of the virtual reality system;
   wherein the somatosensory feedback system instructs the somatosensory feedback device to actuate to indicate to the user a passage of time;
   wherein the somatosensory feedback device comprises:
   at least one shoulder strap;
   a shoulder tap device coupled to the at least one shoulder strap, the should shoulder tap device comprising:
   an arm extending from the at least one shoulder strap; and
   an actuation device coupled to the arm to cause the arm to strike a shoulder of the user.

9. The system of claim 8, wherein the arm comprises a bend around a bending point.

10. A somatosensory feedback system comprising:
at least one somatosensory feedback device to, when actuated, invoke a sensation in a user;
wherein the at least one somatosensory feedback device comprises:
at least one haptic device coupled to at least one shoulder strap, the at least one haptic device comprising a vibro-tactile motor to stimulate mechanoreceptors of the user;
wherein the somatosensory feedback system instructs the at least one somatosensory feedback device to actuate to indicate to the user a passage of time.

11. A somatosensory feedback system comprising:
a housing; and
a number of straps coupled to the housing to couple the housing to a user, and
at least one somatosensory feedback device to, when actuated:
invoke a sensation in the user, and
indicate a passage of time;
the somatosensory feedback device to invoke the sensation in the user where the sensation is associated with, and to reinforce, an expected emotional or physiological response of the user to a stimulus applied to the user at a same time as actuation of the somatosensory feedback device.

12. The somatosensory feedback system of claim 11, wherein the at least one somatosensory feedback device comprises:
a solid-state heat pump coupled to the somatosensory feedback system comprising:
a thermal pad;
a heat sink coupled to the thermal pad; and
control logic coupled to the heat sink to programmatically control the operation of the solid-state heat pump to adjust the temperature of the thermal pad.

13. The somatosensory feedback system of claim 11, wherein the at least one somatosensory feedback device comprises:
a shoulder strap tightening device to tighten at least one shoulder strap of the somatosensory feedback system, the shoulder strap tightening device comprising:
a motor; and
a drive shaft drivable by the motor and coupled to the at least one shoulder strap to tighten or loosen the at least one shoulder strap based on a direction in which the motor is driven.

14. The somatosensory feedback system of claim 11, wherein:
the number of straps comprises at least one shoulder strap; and
the at least one somatosensory feedback device comprises a shoulder tap device coupled to the at least one shoulder strap, the shoulder tap device comprising:
an arm extending from the at least one shoulder strap; and
an actuation device coupled to the arm to cause the arm to strike a shoulder of the user.

15. The somatosensory feedback system of claim 11, wherein the at least one somatosensory feedback device comprises:
a wind generation device coupled to the somatosensory feedback system to force air against the user, the wind generation device comprising:
a fan coupled to the somatosensory feedback system;
at least two ducts fluidically coupled to the fan through which air travels; and
an air switch fluidically coupled between the fan and the at least two ducts to switch air flow within the at least two ducts.

16. A computer program product for providing somatosensory feedback, the computer program product comprising:
a non-transitory, computer readable storage medium comprising computer usable program code embodied therewith, the computer usable program code to, when executed by a processor:
instruct a somatosensory feedback device to actuate;
define at least one actuation parameter of the somatosensory feedback device to invoke an emotion in a user; and
define at least one actuation parameter of the somatosensory feedback device to indicate the passage of time;
wherein the somatosensory feedback device comprises at least one shoulder strap and a shoulder strap tightening device, and wherein the computer usable program code, when executed by the processor:
instructs the shoulder strap tightening device to tighten the at least one shoulder strap, the shoulder strap tightening device comprising:
a motor; and
a drive shaft drivable by the motor and coupled to the at least one shoulder strap to tighten or loosen the at least one shoulder strap based on a direction in which the motor is driven; and
defines at least a tightness provided by the shoulder strap tightening device to invoke an emotion in the user.

17. The computer program product of claim 16, wherein the somatosensory feedback device comprises a shoulder tap device, and wherein the computer usable program code, when executed by the processor:
instructs the shoulder tap device coupled to at least one shoulder strap of a somatosensory feedback system to activate, the shoulder tap device comprising:
an arm extending from the at least one shoulder strap; and
an actuation device coupled to the arm to cause the arm to strike a shoulder of the user;
defines at least one actuation parameter of the actuation device to invoke an emotion in the user; and
instructs the shoulder tap device to actuate based on the passage of time.

18. The computer program product of claim 16, wherein the somatosensory feedback device comprises a wind generation device, and wherein the computer usable program code, when executed by the processor:
instructs the wind generation device coupled to the somatosensory feedback system to force air against the user, the wind generation device comprising:
a fan coupled to the somatosensory feedback system;
at least two ducts fluidically coupled to the fan through which air travels; and
an air switch fluidically coupled between the fan and the at least two ducts to switch air flow within the at least two ducts; and
defines at least the strength of the current of air provided by the wind generation device to invoke an emotion in the user.

* * * * *